(12) United States Patent
Jain et al.

(10) Patent No.: US 10,380,889 B2
(45) Date of Patent: Aug. 13, 2019

(54) DETERMINING CAR POSITIONS (71) Applicant: HEWLETT PACKARD ENTERPRISE DEVELOPMENT LP, Houston, TX (US)

(72) Inventors: Puneet Jain, Palo Alto, CA (US); Soteris Demetriou, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/664,357

(22) Filed: Jul. 31, 2017

(65) Prior Publication Data

US 2019/0035271 A1  Jan. 31, 2019

(51) Int. Cl.
*B60R 25/102* (2013.01)
*B60R 25/33* (2013.01)
*G08G 1/123* (2006.01)
*G06K 9/00* (2006.01)

(52) U.S. Cl.
CPC ......... *G08G 1/123* (2013.01); *G06K 9/00791* (2013.01); *G06K 2209/27* (2013.01)

(58) Field of Classification Search
CPC .................................................... G08G 1/123
See application file for complete search history.

(56) References Cited

U.S. PATENT DOCUMENTS

| 8,311,730 | B2 | 11/2012 | Neff |
| 2008/0082261 | A1 | 4/2008 | Tengler et al. |
| 2010/0164789 | A1 | 7/2010 | Basnayake |
| 2010/0223332 | A1 | 9/2010 | Maxemchuk et al. |
| 2013/0015984 | A1 | 1/2013 | Yamashiro |
| 2013/0093618 | A1* | 4/2013 | Oh .......................... G01S 19/41 342/357.44 |
| 2014/0156176 | A1 | 6/2014 | Caskey et al. |
| 2015/0099552 | A1* | 4/2015 | Chen ..................... H04W 4/029 455/457 |

(Continued)

OTHER PUBLICATIONS

Niklas Magnusson, "Improving Absolute Position Estimates of an Automotive Vehicle Using GPS in Sensor Fusion"; Chalmers, Signals and Systems, Master's Thesis 2012:EX048, 82 pages.

(Continued)

*Primary Examiner* — Joseph H Feild
*Assistant Examiner* — Pameshanand Mahase
(74) *Attorney, Agent, or Firm* — Hewlett Packard Enterprise Patent Department (57) ABSTRACT

Examples provided herein describe a method for determining car positions. For example, a physical processor of an edge computing device may receive position data for a legacy car and information about a make and model of the legacy car. The first edge device may also receive, from a sensor-rich car, a set of sensor data about a set of observed cars in the vicinity of the sensor-rich car, a set of position data for the set of observed cars, and a set of visual data of the set of observed cars, wherein the set of observed cars includes the legacy car and the sensor-rich car. The edge device may then determine an updated position for the legacy car based on the set of position data for the set of observed cars, the set of visual data, and the set of sensor data and provide the updated position of the legacy car.

20 Claims, 4 Drawing Sheets

(56) References Cited

U.S. PATENT DOCUMENTS

| | | | |
|---|---|---|---|
| 2016/0229404 | A1 | 8/2016 | Byun |
| 2017/0076598 | A1* | 3/2017 | Scofield ............... G08G 1/0112 |
| 2017/0166205 | A1 | 6/2017 | Ichinokawa |
| 2018/0038953 | A1* | 2/2018 | Choi ....................... B60R 21/00 |
| 2018/0211115 | A1* | 7/2018 | Klein ................. G06K 9/00771 |
| 2018/0261094 | A1* | 9/2018 | Nishimura ................ G06T 7/74 |

OTHER PUBLICATIONS

Yuan et al., "Driving with knowledge from the physical world", In KDD (2011), ACM, pp. 316-324.
You et al., "Carsafe app: alerting drowsy and distracted drivers using dual cameras on smartphones", In MobiSys (2013), ACM, pp. 461-462.
Yoon et al., "Surface street traffic estimation", In MobiSys (2007), ACM, pp. 220-232.
Wilkinson, Rhian, "Cloud vs Edge in an IoT World", (web page), available online at <https://knect365.com/cloud-enterprise-tech/article/3cc5f731-cab5-4f8c-bb22-e2f67142c729/cloud-vs-edge-in-an-iot-world>, May 17, 2016, 8 pages.
Wang et al., "Visually fingerprinting humans without face recognition", In MobiSys (2015), ACM, pp. 345-358.
Velas et al., "Calibration of RGB Camera With Velodyne LiDAR", WSCG2014 Conference on Computer Graphics, Visualization and Computer Vision, pp. 135-144.
Tummala et al., "Roadview: Live View of On-Road Vehicular Information", 14th Annual IEEE International Conference on Sensing, Communication, and Networking (SECON), 2017, 9 pages.
Thiagarajan et al., "VTrack: accurate, energy-aware road traffic delay estimation using mobile phones", In SenSys (2009), ACM, pp. 85-98.
Teslamotors2016sales, "Tesla Motors (TSLA) 1Q 2016 Sales: 14,820 Model S, Model X Cars Were Delivered in First Three Months; Model S Sales Jumped 45%", by Angelo Young, Apr. 4, 2016, 9 pages.
Telsa Auto Pilot, "Your Autopilot has arrived", Oct. 14, 2015, 2 pages.
Stanford Autonomous Driving team, (web page), available online at < http://driving.stanford.edu/ >, 2014, 1 page.
Ryan, Whitwam, "How Googles self-driving cars detect and avoid obstacles", (web page), available online at <http://www.extremetech.com/extreme/189486-how-googles-self-driving-cars-detect-and-avoid-obstacles>, Sep. 8, 2014, 13 pages.
Ren et al., "Faster R-CNN: Towards Real-Time Object Detection with Region Proposal Networks", In Advances in neural information processing systems, 2015, pp. 91-99.
Nvidia Drive Platform, Scalable AI Platform for Autonomous Driving, (web page), available online at < https://www_nvidia.comien-us/self-driving-cars/drive-platform/ >, Apr. 8, 2018, 11 pages.
Nebehay et al., "Clustering of Static-Adaptive correspondences for deformable object tracking", In CVPR (2015), IEEE., pp. 2784-2791.
Morishita et al., "Sakurasensor: quasi-realtime cherry-lined roads detection through participatory video sensing by cars", In UbiComp (2015), ACM, pp. 695-705.
Mohan et al., Nericell: rich monitoring of road and traffic conditions using mobile smartphones. In SenSys (2008), ACM, pp. 323-336.
Modsching et al., "Field trial on gps accuracy in a medium size city: The influence of built-up", Proceedings of the 3rd Workshop on Positioning, Navigation and Communication, 2006, pp. 209-218.
McCall et al., "An integrated, robust approach to lane marking detection and lane tracking", IEEE. In Intelligent Vehicles Symposium, 2004, pp. 533-537.
Mathur et al., "Parknet: drive-by sensing of road-side parking statistics", In MobiSys (2010), ACM, pp. 123-136.
Maldonado-Bascon et al., "Road-sign detection and recognition based on support vector machines", IEEE Transactions on Intelligent Transportation Systems, vol. 8, No. 2, Jun. 2007, pp. 264-278.
Li et al., "ForeSight: Mapping vehicles in visual domain and electronic domain", IEEE Infocom 2014—IEEE Conference on Computer Communications, 2014, 9 pages.
Levinson et al., "Towards fully autonomous driving: systems and algorithms", IEEE intelligent vehicles symposium IV (2011), vol. 1, pp. 163-168.
Levinson et al., "Robust vehicle localization in urban environments using probabilistic maps", 2010 IEEE International Conference on Robotics and Automation, pp. 4372-4378.
Levinson et al., "Automatic online calibration of cameras and lasers", Robotics: Science and Systems 2013, pp. 29-36.
Krause et al., "3d object representations for line-grained categorization", In 2013 IEEE International Conference on Computer Vision Workshops, pp. 554-561.
Koukoumidis et al., "SignalGuru: Leveraging mobile phones for collaborative traffic signal schedule advisory", In MobiSys, 2011, ACM, pp. 127-140.
Jiang et al., "Carloc: Precise positioning of automobiles", In SenSys, 2015, ACM, pp. 253-265.
Jia et al., "Caffe: Convolutional architecture for fast feature embedding", Cornell University, 2014, 4 pages.
Held et al., "Combining 3d shape, color, and motion for robust anytime tracking", In RSS, 2014, 10 pages.
Grewal, Mohinder S., "Kalman filtering", In: Lovric M. (eds) International Encyclopedia of Statistical Science, 2011, 410 pages.
Greenfeld et al., "Matching gps observations to locations on a digital map", In Transportation Research Board 81st Annual Meeting, 2002, 13 pages.
GPS Device Accuracy in City Environments by Tracking System Direct, available online at < https://www.tracking-system.com/gps-device-accuracy-in-city-environments/ >, Jul. 19, 2011, 4 pages.
Geiger et al., "Vision meets robotics: The kitti dataset",International Journal of Robotics Research, vol. 32, Issue 11, 2013, pp. 1231-1237.
Fabritiis et al., "Traffic estimation and prediction based on real time floating car data", In Intelligent Transportation Systems, (ITSC), Oct. 2008, IEEE, pp. 197-203.
European Search Report and Search Opinion Received for EP Application No. 18186423.2, dated Dec. 19, 2018, 9 pages.
Dorj et al., "A precise lane detection algorithm based on top view image transformation and least-square approaches", Journal of Sensors, vol. 2016, 2015, pp. 1-13.
Demetriou et al., "CoDrive: Improving Automobile Positioning via Collaborative Driving", IEEE Infocom 2018—IEEE Conference on Computer Communications, Apr. 2018, 9 pages.
Dan Mihalascu, "BMW Demonstrates 2016 7-Series' Remote Control Parking", (web page), available online at < https://www.carscoops.com/2015/06/bmw-demonstrates-2016-7-series-remote/ >, Jun. 13, 2015, 13 pages.
Colin Goodall, Procrustes methods in the statistical analysis of shape. Journal of the Royal Statistical Society. Series B (Methodological), vol. 53, No. 2, 1991, pp. 285-339.
Chen et al., "Invisible sensing of vehicle steering with smartphones", In MobiSys, 2015, ACM, pp. 1-13.
Bulusu et al., "GPS-less Low Cost Outdoor Localization for Very Small Devices", IEEE personal communications, 2000, 7 pages.
Buhrmester et al., "Amazon's mechanical Turk: A new source of inexpensive, yet high-quality, data?", Perspectives on psychological science, vol. 6, No. 1, 2011, pp. 3-5.
Blind Motion Project, "Machine learning in navigation devices: detect maneuvers using accelerometer and gyroscope", Apr. 11, 2015, 16 pages.
Birchfield et al., "Spatiograms versus histograms for region-based tracking", In CVPR, vol. 2, 2005, IEEE, pp. 1158-1163.
Aslam et al., "City-scale traffic estimation from a roving sensor network", In SenSys, 2012, ACM, pp. 141-154.
Agrawal et al., "Real-time localization in outdoor environments using stereo vision and inexpensive gps", In International Conference on Pattern Recognition (ICPR), 2006, pp. 1063-1068.
"Ford Targets Fully Autonomous Vehicle for Ride Sharing in 2021; Invests in New Tech Companies, Doubles Silicon Valley Team", (web page), available online at <https://media.ford.com/contentifordmedia/fna/us/en/news/2016/08/16/ford-targets-fully-autonomous-vehicle-for-ride-sharing-in-2021.html>, Ford Media Center, Aug. 16, 2016, 4 pages.

(56) References Cited

OTHER PUBLICATIONS

"Average Age of Light Vehicles in the U.S. Rises to 11.5 Years, IHS Says", (web page), Engineering360 News Desk, available online at <https://insights.globalspec.com/article/1287/average-age-of-light-vehicles-in-the-u-s-rises-to-11-5-years-ihs-says>, Jul. 29, 2015, 3 pages.

* cited by examiner

DETERMINING CAR POSITIONS

BACKGROUND

Cars are being manufactured with increasingly sophisticated technologies, like sensors, cameras, self-driving capabilities, and so forth. These sensor-rich cars share the road with legacy cars that may not have inbuilt sensors, cameras, and/or other sophisticated technologies. With the differing technical capabilities available for cars, enabling an efficient driving environment for all cars on a road may be difficult.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for determining car positions. The disclosed examples may include systems, devices, computer-readable storage media, and methods for determining car positions. For purposes of explanation, certain examples are described with reference to the components illustrated in FIGS. 1-4. The functionality of the illustrated components may overlap, however, and may be present in a fewer or greater number of elements and components.

Figure 3:
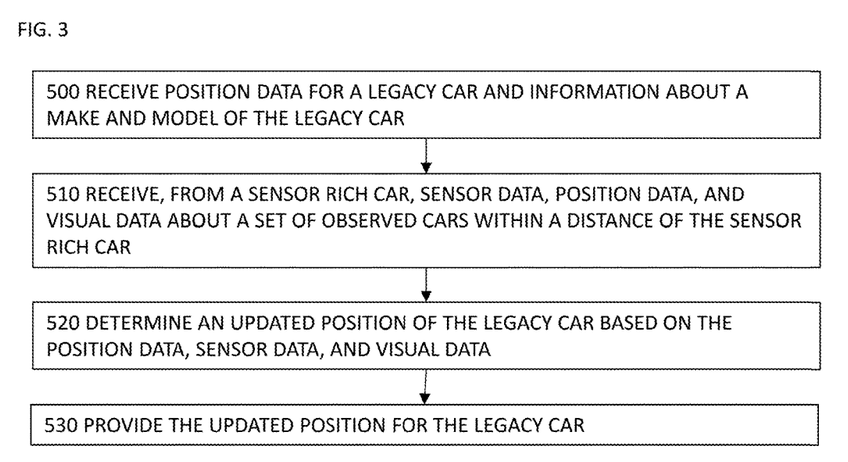
FIG. 3 is a flow diagram depicting an example method for determining car positions.
Figure 4:
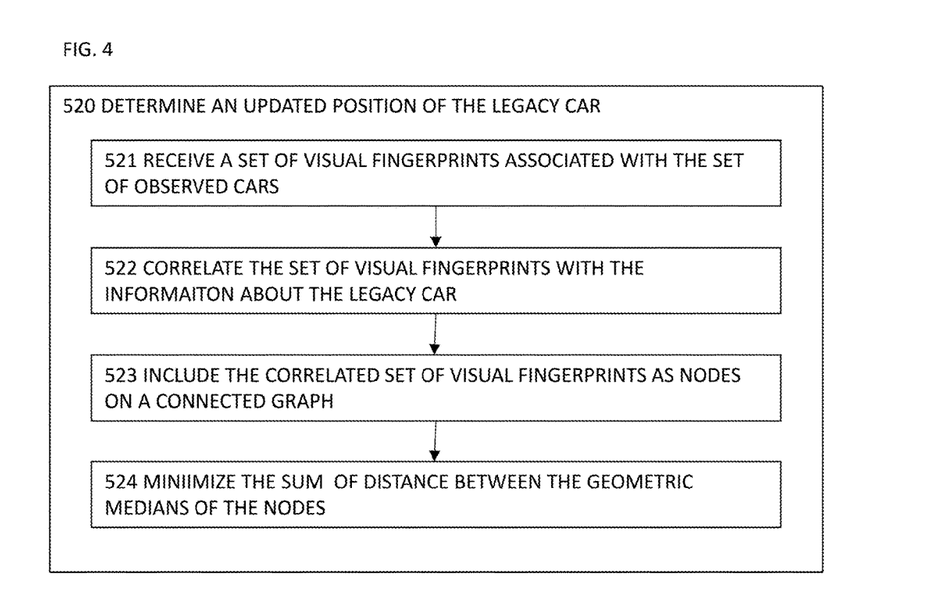
FIG. 4 is a flow diagram depicting an example method for determining car positions.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

Cars are being manufactured with increasingly sophisticated technologies, like sensors, cameras, self-driving capabilities, and so forth. These sensor-rich cars share the road with legacy cars that may not have the inbuilt sensors, cameras, and/or other sophisticated technologies.

A car may include, for example, any vehicle that includes an engine, at least one wheel, a body that may hold cargo and/or humans, and that is capable of moving from one location to another using the engine and the at least one wheel. A sensor-rich car may include, for example, any car that has the technical capabilities to determine its own position on a road and the position of objects in its vicinity, using inbuilt sensors, cameras, onboard computers, LIDAR (light detection and radar), and/or other technologies. A legacy car may include, for example, any car that does not include the technical capabilities to determine its own position on a road. In some examples, a legacy car may not include the ability to determine other objects in its vicinity as well.

A sensor-rich car may be able to determine, based on its knowledge of its position on the road and the positions of other objects in its vicinity, a speed at which to travel, a lane in which to travel, whether the car needs to re-adjust in its own lane, whether the car needs to change to another lane in the road, and/or other decisions to more efficiently drive on the road. A legacy car, however, may need rely on traditional GPS solutions for navigation services, with an accuracy that varies from 5 to 10 meters in a clear line of sight and which may degrade in downtown environments. As such, a legacy car may not be able to determine a precise position of itself on the road or make decisions regarding how to drive more efficiently on the road. The inability of the legacy car to determine its own precise position may also hinder the ability of a sensor-rich car to drive efficiently, as the sensor-rich car may have not have accurate data about how the legacy car is positioned or intends to move. As such, a technical challenge exists in enabling all cars on a road to drive efficiently.

A technical solution to these technical challenges would enable a more efficient driving environment by precisely positioning both legacy and sensor-rich cars. The positioning technique may leverage self-reported positioning and data gathered by a sensor-rich car about other cars in its vicinity to determine more accurate and precise positions of cars on a road. For example, the positioning technique may utilize processing capabilities of a sensor-rich car to analyze data from sensors, cameras, LIDAR, and/or other object detection technology in a sensor-rich car. The sensor-rich car may construct a set of visual fingerprints of each of the cars in its vicinity and may provide the set of visual fingerprints to an edge device communicably coupled to the sensor-rich car. The edge device may also receive position information and information about a legacy car from a mobile device communicably connected to the edge device. The edge device may correlate the visual fingerprints of the cars with the legacy car information to determine more accurate positions of the sensor-rich and legacy cars. In some examples, the edge device may also consider road boundaries in optimizing determined positions as well. The edge device may then use tracked vehicle dynamics to help suggest future movements of a car.

Examples discussed herein address these technical challenges by providing a technical solution that determines car positions. For example, the technical solution may receive, by a physical processor of an edge computing device, position data for a legacy car and information about a make and model of the legacy car. The first edge device may also receive, from a sensor-rich car, a set of sensor data about a set of observed cars in the vicinity of the sensor-rich car, a set of position data for the set of observed cars, and a set of visual data of the set of observed cars, wherein the set of observed cars includes the legacy car and the sensor-rich car. The edge device may then determine an updated position for the legacy car based on the set of position data for the set of observed cars, the set of visual data, and the set of sensor data and provide the updated position of the legacy car.

Figure 1:
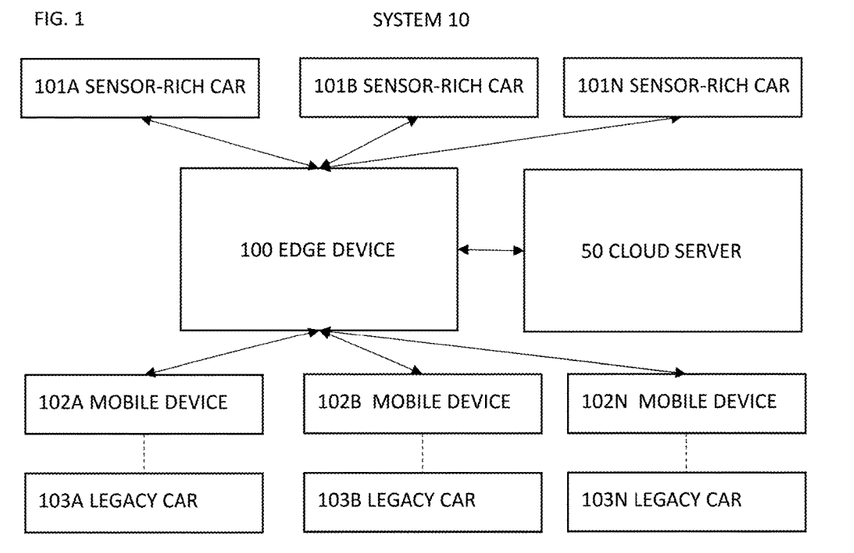
FIG. 1 is a block diagram depicting an example environment in which various examples may be implemented as a system that determines car positions.

FIG. 1 is an example environment in which various examples may be implemented as a system 10 that facilitates determining car positions. In some examples, system 10 that facilitates determining car positions may include various components such as an edge device 100, a set of sensor-rich cars 101A, 101B, . . . , 101N, a set of mobile devices 102A, 102B, . . . , 102N that are associated with a set of legacy cars 103A, 103B, . . . , 103N, a cloud server 50, and/or other devices communicably coupled to the edge device 100. Each edge device 100 may communicate to and/or receive data from the sensor-rich cars (e.g., sensor-rich cars 101A, 101B, . . . , 101N), the mobile devices (e.g., mobile devices 102A, 102B, . . . , 102N), the cloud server 50, and/or other components in a network.

An edge device may comprise an access point, network switch, or other hardware device on a network that comprises a physical processor (e.g., physical processor 110) that implement machine readable instructions to facilitate communication in the network. Physical processor 110 may be at least one central processing unit (CPU), microprocessor, and/or other hardware device suitable for performing the functionality described in relation to FIG. 1.

Cloud server 50 may be any server in a cloud network communicably coupled to edge device 100 that facilitates processing and/or storage of data handled by edge device 100.

Sensor-rich cars 101A, 101B, . . . , 101N may be any sensor-rich car that may communicate to the edge device 100 (e.g., via a cloudlet, onboard computer, and/or other transmission capability in the sensor-rich car 101A).

Mobile device 102A, 102B, . . . , 102N may be any mobile computing device that comprises a physical processor, a non-transitory machine readable storage medium, wireless and/or cellular network connection capability, and GPS functionality, and that is able to communicate to edge device 100. Each mobile device 102A, 102B, . . . , 102N may be associated with a respective legacy car 103A, 103B, . . . , 103N.

As mentioned above, a sensor-rich car (e.g., sensor rich car 101N) may include, for example, any car that has the technical capabilities to determine its own position on a road and the position of objects in its vicinity, using inbuilt sensors, cameras, onboard computers, LIDAR (light detection and radar), and/or other technologies. A legacy car (e.g., legacy car 103N) may include, for example, any car that does not include the technical capabilities to determine its own position on a road. In some examples, a legacy car (e.g., legacy car 103N) may not include the ability to determine other objects in its vicinity as well.

System 10 may leverage self-reported positioning and data gathered by a sensor-rich car about other cars in its vicinity to determine more accurate and precise positions of cars on a road. For example, system 10 may utilize the processing capabilities of sensor-rich cars (e.g., sensor-rich cars 101A, 101B, . . . , 101N), mobile devices 102A, 102B, . . . , 102N, the edge device 100, the cloud server 50, and/or any combination thereof to determine more accurate and precise positions of cars on a road.

In some examples, the sensor-rich car (e.g., car 101N) may comprise a physical processor that implements machine-readable instructions stored in a non-transitory machine-readable storage medium to analyze data from sensors, cameras, LIDAR, and/or other object detection technology in the sensor-rich car (e.g., car 101N). The machine-readable storage medium of the sensor-rich car (e.g., car 101N) may be any electronic, magnetic, optical, or other physical storage device that contains or stores executable instructions. In some implementations, machine-readable storage medium may be a non-transitory storage medium, where the term "non-transitory" does not encompass transitory propagating signals. In one example, the machine-readable instructions stored in the machine-readable medium may be part of an installation package that when installed can be executed by the physical processor of the sensor-rich car (e.g., sensor-rich car 101N). In another example, the machine-readable instructions may be part of an application (e.g., a cloudlet and/or other type of application) or applications already installed in the sensor-rich car (e.g., sensor-rich car 101N). In some examples, the physical processor of the sensor-rich car (e.g., sensor-rich car 101N) may implement the machine-readable instructions to perform the functionality described herein.

The sensor-rich car (e.g., sensor-rich car 101N) may acquire data from a set of sensor, a set of cameras, LIDAR, a GPS, and/or other object detection technology of the sensor-rich car to detect cars in the vicinity of the sensor-rich car. The vicinity of the sensor-rich car may include, for example, a predetermined distance surrounding the sensor-rich car, a distance to which the object detection is able to detect objects, and/or another distance related to the sensor-rich car.

In some examples, the sensor-rich car (e.g., sensor-rich car 101N) may perform object detection of every nth frame of a set of cameras of the sensor-rich car to detect cars in a frame, where n is a positive integer. The detected cars may include both legacy cars and sensor-rich cars. Because the frames from the set of cameras may comprise different viewpoints of the cars, the sensor-rich car (e.g., sensor-rich car 101N) may use a trained object differentiator that may determine, given a set of images, whether the same or different objects appear in those images. The sensor-rich car (e.g., sensor-rich car 101N) may use the trained object differentiator to determine a final set of detected cars as a set of observed cars detected by the object detection technologies of the sensor-rich car. In some examples, the sensor-rich car (e.g., sensor-rich car 101N) may include visual data for each of the set of observed cars on a SLAM ("Simultaneous Localization and Mapping") map.

The sensor-rich car (e.g., car sensor-rich car) may then estimate a distance and/or angle of the each of the set of observed cars from the sensor-rich car based on information received via the LIDAR. In some examples, the sensor-rich car (e.g., sensor-rich car 101N) may overlay a LIDAR point cloud on top of the frames received from the camera to estimate the distance and angle of the set of observed cars. In these examples, the sensor-rich car (e.g., sensor-rich car 101N) may transform the point cloud using rotation and translation to ensure symmetry of viewpoint of the LIDAR point cloud and the camera frame. In some examples, the sensor-rich car (e.g., sensor-rich car 101N) may overlay the LIDAR point cloud on the SLAM map (after performing the appropriate transformation using rotation and translation).

The sensor-rich car (e.g., sensor-rich car 101N) may generate visual fingerprints for each of the cars in the set of observed cars. The visual fingerprint for an observed car may comprise, for example, SLAM data associated with the observed car, the visual data for an observed car, the distance/angle information relating the car to the sensor-rich car, metadata about the observed car (e.g., information about color, number of doors, car type, car features, etc.), a gps position of the observed car, any combination thereof, and/or other information identifying the car.

The sensor-rich car (e.g., sensor-rich car 101N) may send the set of generated visual fingerprints of each of the set of detected cars to the edge device 100. In some examples, the sensor-rich car (e.g., sensor-rich car 101N) may send the set of generated visual fingerprints, the gps position of each of the set of observed cars, the LIDAR information for each of the set of observed cars, position information for the sensor-rich car (e.g., car sensor-rich car) and for the rest of the set of observed cars, and/or other information to the edge device 100.

In some examples, the sensor-rich car (e.g., sensor-rich car 101N) may send the LIDAR information for each of the set of observed cars, position information for the sensor-rich car (e.g., car sensor-rich car) and for the rest of the set of observed cars, and/or other information used to determine the set of visual fingerprints to the edge device 100, and the edge device may generate the set of visual fingerprints.

System 10 may also utilize the processing capabilities of a mobile device (e.g., mobile device 102N) associated with a legacy car (e.g., legacy car 103N) to determine more accurate and precise positions of cars on a road.

In some examples, the mobile device (e.g., mobile device 102N) may comprise a physical processor that implements machine-readable instructions stored in a non-transitory machine-readable storage medium to determine position information and car information about an associated legacy car (e.g., legacy car 103N) and provide that position information and car information to edge device 100. The machine-readable storage medium of the mobile device (e.g., mobile device 102N) may be any electronic, magnetic, optical, or other physical storage device that contains or stores executable instructions. In some implementations, machine-readable storage medium may be a non-transitory storage medium, where the term "non-transitory" does not encompass transitory propagating signals. In one example, the machine-readable instructions stored in the machine-readable medium may be part of an installation package that when installed can be executed by the physical processor of the mobile device (e.g., mobile device 102N). In another example, the machine-readable instructions may be part of an application or applications already installed in the mobile device (e.g., mobile device 102N). In some examples, the physical processor of the mobile device (e.g., mobile device 102N) may implement the machine-readable instructions to perform the functionality described herein.

The mobile device (e.g., mobile device 102N) may determine position information for the legacy car (e.g., legacy car 103N) based on gps position data of the mobile device, and/or any other position information available on the mobile device. The mobile device (e.g., mobile device 102N) may provide information (e.g., position information and car information) associated with a single legacy car (e.g., legacy car 103N) to the edge device 100. In some examples, the mobile device (e.g., mobile device 102N) may have a unique association with a single legacy car (e.g., legacy car 103N). In other examples, the mobile device (e.g., mobile device 102N) may have a plurality of associations with a respective plurality of legacy cars (e.g., legacy cars 101A, 101N), but may be restricted to providing position information and car information about only a single legacy car (e.g., legacy car 103N) to the edge device 100. In these other examples, the mobile device (e.g., mobile device 102N) may receive an indication of the legacy car (e.g., legacy car 103N) to which it may be associated for purposes of sending data to the edge device 100. Further, the mobile device (e.g., mobile device 102N) may need to provide confirmation that the mobile device is within a predetermined distance of the legacy car (e.g., legacy car 103N) in order to provide information about the legacy car (e.g., legacy car 103N) to the edge device. In some of these examples, a single legacy car may be associated with multiple mobile devices, but only one mobile device may be allowed to provide information about the single legacy car to the edge device 100.

The mobile device (e.g., mobile device 102N) may create an association with a legacy car (e.g., legacy car 103N) by receiving car information about the legacy car and creating a profile for the legacy car based on the received car information. The car information may comprise, for example, a make and model of the car, a color of the car, a type of the car, a year in which the car was manufactured, information about a set of drivers of the car, any combination thereof, and/or other features of the car. In some examples, responsive to creating a profile for the legacy car (e.g., legacy car 103N), the mobile device (e.g., mobile device 102N) may provide the profile to the edge device 100 and/or the cloud server 50. The edge device 100 and/or the cloud server 50 may create a fingerprint for the legacy car (e.g., legacy car 103N) based on the provided profile. The edge device 100 may store the fingerprint for the legacy car (e.g., legacy car 103N). In some examples, the stored fingerprint may not be modifiable.

Responsive to the mobile device (e.g., mobile device 102N) confirming that it is within a predetermined distance of the legacy car (e.g., legacy car 103N), the mobile device may track the location of the legacy car and provide position data and car information about the legacy car to the edge device 100. In some examples, the mobile device (e.g., mobile device 102N) may provide this information while also providing navigation information and/or instructions via a screen of the mobile device.

The edge device 100 may receive sets of visual fingerprints from multiple sensor-rich cars (e.g., sensor-rich cars 101A, 101B, . . . , 101N) and may receive position information and car information from a set of mobile devices (e.g., mobile devices 102A, 102B, . . . , 102N) associated with a set of legacy cars (e.g., legacy cars 103A, 103B, . . . , 103N). The edge device 100 may construct a connected graph (e.g., a SLAM map, a spatiogram, and/or other graph that comprises nodes and edges) to represent the road on which the sets of observed cars associated with the sets of visual fingerprints may be driving.

To construct the connected graph, the edge device 100 may correlate the sets of visual fingerprints received from the sensor-rich cars (e.g., sensor-rich cars 101A, 101B, . . . , 101N). The edge device 100 may correlate the sets of visual fingerprints from each of the sensor-rich rich cars (e.g., sensor-rich cars 101A, 101B, . . . , 101N). In some examples, the edge device 100 may determine correlation values between visual fingerprints from each sensor-rich device and may join visual fingerprints received from multiple sensor-rich cars as a single visual fingerprint of the car. In these examples, the edge device 100 may include a single node on the connected graph to represent a single visual fingerprint associated with a single car. In other examples, the edge device 100 may receive and/or generate connected graphs of each of the sets of visual fingerprints and may overlay the connected graphs to determine a set of nodes to represent the set of observed cars.

The edge device 100 may also correlate the sets of visual fingerprints with the information received from the mobile devices (e.g., mobile devices 102A, 102B, . . . , 102N) associated with the legacy cars (e.g., legacy cars 103A, 103B, . . . , 103N) and may update and/or add nodes to the connected graph to represent the legacy cars (e.g., legacy cars 103A, 103B, . . . , 103N). In some examples, the edge device 100 may correlate a visual fingerprint from a sensor-rich car (e.g., sensor-rich car 101N) with information received from a mobile device (e.g., mobile device 102) by correlating a make and model of the legacy car (e.g., legacy car 103N) associated with the mobile device to the visual fingerprint.

Responsive to generating a connected graph that comprises a node for each of the cars in the set of observed cars, the edge device 100 may determine a precise position for each car in the set of observed cars. The edge device 100 may determine a set of constraints related to the road scene represented by the connected graph. The edge device 100 may then determine the precise position of each of the set of observed cars based on the set of constraints and the connected graph. Responsive to determining the precise position of each of the set of observed cars, the edge device 100 may then update the nodes in the connected graph to include information about the determined precise position.

To determine the precise position of a car (which may be a sensor-rich car or a legacy car), the edge device 100 may utilize the self-reported location of the car (e.g., a gps position of the car and/or a gps position of the mobile device associated with the legacy car) and locations of the car reported by the set of sensor-rich cars (e.g., sensor-rich car 101A, 101B, . . . 101N). The edge device 100 may determine the precise position of each car by minimizing the cumulative positioning error of all cars that are in a road scene. The edge device 100 may minimize the cumulative positioning error by minimizing distances between all reported locations of each of the cars cumulatively. The edge device 100 may perform this minimizing cumulatively as the determination for a precise position for one car on a road may affect the determination for a precise position for another car on that same road.

In this determination, $C_{1,2}$ may be the position of car 1 as reported by car 2, where the reported position x, y may comprise easting x and northing y. $V_1$ may comprise a set of views of car 1, where the cardinality of $V_1$ comprises a number of sensor-rich cars that detected car 1. Each view $V_{1,2}$ of car 1 by car 2 comprises a distance d between car 1 and car 2 and a bearing or heading of the observation $O_{1,2}$.

In the situation in which only a single car appears on the road, the edge device 100 may determine its positioning error as the distance between its true location and its self-reported location. As the edge device 100 may not know the true location of the car, the edge device 100 may determine no error exists and may not change the connected graph that represents a road scene with the single car.

In a situation where multiple cars exist on a road scene, the edge device 100 may determine the cumulative positioning error for a car on the road scene as the sum of distances from the geometric median of all reported positions of that car. The edge device 100 may determine the precise position for the car by minimizing the sum of distances from the geometric median of all reported positions of the car and may update the node associated with the car to reflect the precise position.

In some examples, the edge device 100 may also consider the gps position data for the car 1 and may restrict the precise position of the car 1 to be within the intersection of multiple confidence regions. For example, the edge device 100 may determine each reported position $C_{1,2}$ of the car 1 as the center of a circle that has a radius determined by a confidence in the reported location, where the location confidence may be provided by car 2. The edge device 100 may restrict the precise position of the car 1 to be within the intersection of each of the circles related to views $V_1$ of the car 1.

In some examples, the edge device 100 may consider other constraints related to the set of observed cars, the road, and/or other entities or factors related to the road scene. For example, the edge device 100 may consider distance and angle constraints (e.g., from LIDAR information from a sensor-rich car), road constraints, and/or other constraints. The edge device 100 may consider the road constraints by determining a road and/or set of roads closest to the majority of reported locations. The edge device 100 may then generate a set of road constraints that include location points and boundaries of the road(s). The set of road constraints my include information about lanes in the road, HOV lanes, exit lanes, ramps, and/or other features of the road(s) on which the set of observed cars ride.

In examples in which the edge device 100 also considers constraints, the connected graph generated and updated by the edge device 100 responsive to determining the precise positions of each of the set of observed cars may comprise a set of nodes including information about the precise position of the respective set of observed cars and edges relating to the data received by the sensor-rich cars (e.g., sensor-rich cars 101A, 101B, . . . , 101N).

Responsive to determining the precise position of each of the set of observed cars and updating the connected graph, the edge device 100 may provide, to each of the set of observed cars, its determined precise position. For a sensor-rich car (e.g., sensor-rich car 101N), the edge device 100 may provide the precise position of the sensor-rich car and the precise positions of the legacy cars (e.g., legacy cars 103A, 103B, . . . , 103N) observed in the set of observed cars. The sensor-rich car (e.g., sensor-rich car 101N) may use the provided precise positions to make decisions about a next move of the sensor-rich car. For a legacy car (e.g., legacy car 103N), the edge device 100 may provide the precise position of the legacy car to the mobile device (e.g., mobile device 102N) associated with the legacy car (e.g., legacy car 103N). The mobile device (e.g., mobile device 102N) may locally track vehicle dynamics in the legacy car (e.g., turns, lane changes, etc.) to keep updating the position of the car from the provided precise position. For example, the mobile device (e.g., mobile device 102N) may detect steering maneuvers of the car from the inertial sensors, gyroscope, and/or other movement detection technologies of the mobile device. In some examples, the mobile device (e.g., mobile device 102N) may comprise a gyroscope that has been trained to detect distance and angle changes from a neural network that machine learned the effect of distance and angle movements on mobile device gyroscopes. The mobile device (e.g., mobile device 102N) may also periodically receive updated precise positions of the associated legacy car (e.g., legacy car 103N) from the edge device 100 responsive to providing position data and car information to the edge device 100.

According to various implementations, a system that facilitates determining car positions and the various components described herein may be implemented in hardware and/or a combination of hardware and programming that configures hardware. Furthermore, in FIG. 1 and other Figures described herein, different numbers of components or entities than depicted may be used.

Figure 1A:
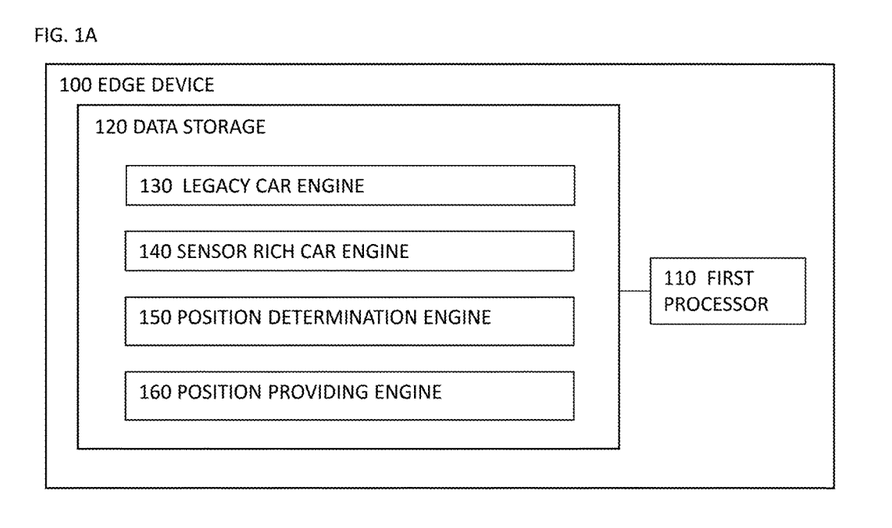
FIG. 1A is a block diagram depicting an example edge device for determining car positions.

FIG. 1A is a block diagram depicting an example edge device for facilitating determining car positions. In some examples, the example edge device 100 may comprise the edge device 100 of FIG. 1. Edge device, which determines positions of cars 101A, 101B, 101N, may comprise a physical processor 110, a legacy car engine 130, a sensor-rich car engine 140, a position determination engine 150, position providing engine 160, and/or other engines. The term "engine", as used herein, refers to a combination of hardware and programming that performs a designated function. As is illustrated with respect to FIGS. 1A-1B, the hardware of each engine, for example, may include one or both of a physical processor and a machine-readable storage medium, while the programming is instructions or code stored on the machine-readable storage medium and executable by the physical processor to perform the designated function.

Legacy car engine 130 may receive information, from a mobile device (e.g., mobile device 102N) associated with a legacy car (e.g., legacy car 103N). The information may comprise position data of the legacy car, information about a make and model of the legacy car, and/or other information about the legacy car (e.g., legacy car 103N). In some examples, legacy car engine 130 may receive the information from the mobile device (e.g., mobile device 102N) associated with the legacy car (e.g., legacy car 103N) in a manner the same as or similar to that described above with respect to FIG. 1.

The sensor-rich car engine 140 may receive, from a sensor-rich car (e.g., sensor-rich car 101N), a set of sensor data about a set of observed cars within a distance of the sensor-rich car, a set of position data for the set of observed cars, and a set of visual data of the set of observed cars. In some examples, the sensor-rich car (e.g., sensor-rich car 101N) may provide information about itself and the set of observed cars in the vicinity of the sensor-rich car. As such, the set of observed cars may include a legacy car (e.g., legacy car 103N) and the sensor-rich car (e.g., sensor-rich car 101N). In some examples, sensor-rich car engine 140 may receive the information in a manner the same as or similar to that described above with respect to FIG. 1.

Position determination engine 150 may determine an updated position for the legacy car. The position determination engine 150 may determine the updated position for the legacy car based on a correlation of information about the position of the legacy car with the set of sensor data, the set of position data, and the set of visual data. In some examples, the position determination engine 150 may generate a connected graph relating to a road scene of the legacy car (e.g., legacy car 103N) and sensor-rich car (e.g., sensor-rich car 101N) and may add nodes relating to each of the set of observed cars on the connected graph responsive to correlating the information. The position determination engine 150 may determine a precise position of each of the set of observed cars (including the legacy car) by minimizing a sum of distances between geometric medians of the nodes. In some examples, the position determination engine 150 may perform this functionality in a manner the same as or similar to that described above with respect to FIG. 1.

Position providing engine 160 may provide the updated position for the legacy car (e.g. legacy car 103N). The position providing engine 160 may provide the updated position for the legacy car (e.g., legacy car 103N) to the legacy car (e.g., legacy car 103N). The position providing engine 160 may also track vehicle dynamics for the legacy car (e.g., legacy car 103N) to facilitate driving decisions of the legacy car. The position providing engine 160 may provide the updated position for the legacy car to the sensor-rich car (e.g., sensor-rich car 101N) as well. The position providing engine 160 may also determine a next move of the sensor-rich car (e.g., sensor-rich car 101N) and provide an indication of that next move to the sensor-rich car. In some examples, the position providing engine 160 may perform this functionality in a manner the same as or similar to that described above with respect to FIG. 1.

In performing their respective functions, engines 130-160 may access storage medium 120 and/or other suitable database(s). Storage medium 120 may represent any memory accessible to the edge device 100 that can be used to store and retrieve data. Storage medium 120 and/or other databases communicably coupled to the edge device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The edge device 100 that facilitates determining car positions may access storage medium 120 locally or remotely via a network.

Storage medium 120 may include a database to organize and store data. The database may reside in a single or multiple physical device(s) and in a single or multiple physical location(s). The database may store a plurality of types of data and/or files and associated data or file description, administrative information, or any other data.

Figure 1B:
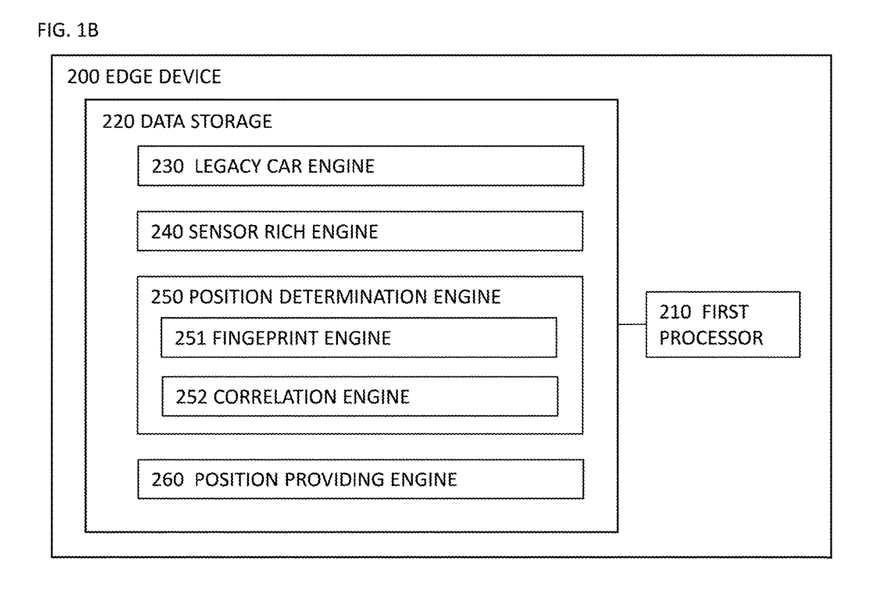
FIG. 1B is a block diagram depicting an example edge device for determining car positions.

FIG. 1B is a block diagram depicting an example edge device 200 that facilitates determining car positions. In some examples, example edge device 200 may comprise edge device 100 of FIG. 1. Edge device 200, which may facilitate determining car positions may comprise a physical processor 210, legacy car engine 230, a sensor-rich car engine 240, a position determination engine 250, a position providing 260, and/or other engines. In some examples, position determination engine 250 may comprise fingerprint engine 251, correlation engine 252, and/or other engines. In some examples, engines 230-260 represent engines 130-160, respectively.

Figure 2A:
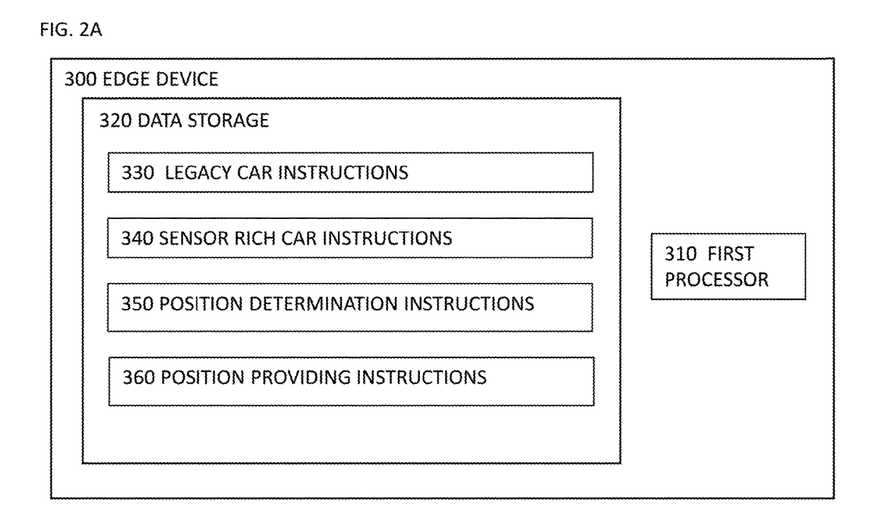
FIG. 2A is a block diagram depicting an example edge device for determining car positions.

FIG. 2A is a block diagram depicting an example machine-readable storage medium 320 comprising instructions executable by a processor for determining car positions.

In the foregoing discussion, engines 130-160 were described as combinations of hardware and programming. Engines 130-160 may be implemented in a number of fashions. Referring to FIG. 2A, the programming may be processor executable instructions 330-360 stored on a machine-readable storage medium 320 and the hardware may include a first processor 310. Thus, machine-readable storage medium 320 can be said to store program instructions or code that when executed by physical processor 310 implements an edge device that facilitates determining car positions of FIG. 1.

In FIG. 2A, the executable program instructions in machine-readable storage medium 320 are depicted as legacy car instructions 330, sensor-rich car instructions 340, position determination instructions 350, position providing instructions 360, and/or other instructions. Instructions 330-360 represent program instructions that, when executed, cause physical processor 310 to implement engines 130-160, respectively.

Figure 2B:
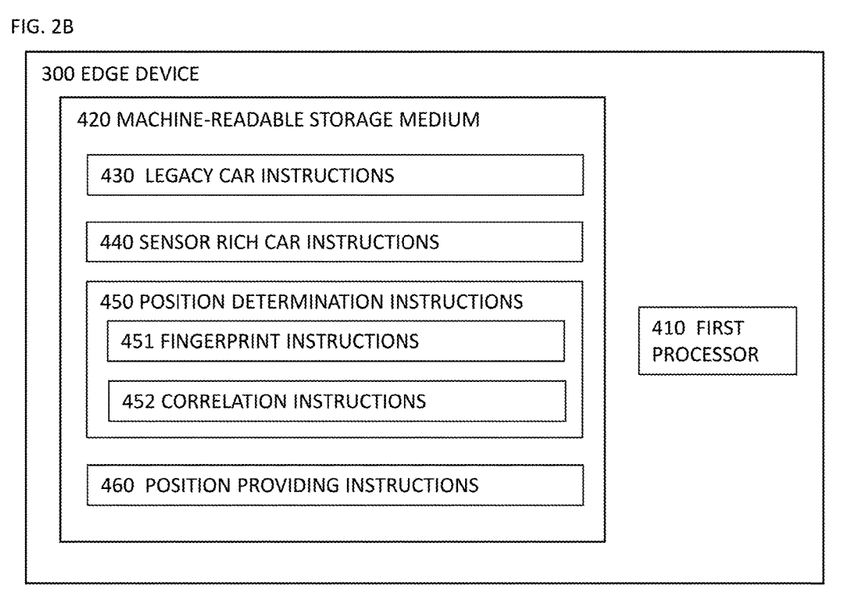
FIG. 2B is a block diagram depicting an example edge device for determining car positions.

FIG. 2B is a block diagram depicting an example machine-readable storage medium 420 comprising instructions executable by a processor for determining car positions.

In the foregoing discussion, engines 230-260 were described as combinations of hardware and programming. Engines 230-260 may be implemented in a number of fashions. Referring to FIG. 2B, the programming may be processor executable instructions 430-460 stored on a machine-readable storage medium 420 and the hardware may include a physical processor 410 for executing those instructions. Thus, machine-readable storage medium 420 can be said to store program instructions or code that when executed by physical processor 410 implement an edge device that facilitates determining car positions of FIG. 2B.

In FIG. 2B, the executable program instructions in machine-readable storage medium 420 are depicted as legacy car instructions 430, sensor-rich car instructions 440, position determination instructions 450, position providing instructions 460, and/or other instructions. In some examples, data position determination instructions 450 may comprise fingerprint instructions 451, correlation instructions 452, and/or other instructions. Instructions 430-460 represent program instructions that, when executed, cause physical processor 410 to implement engines 220-260, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of physical processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement an edge device that facilitates determining car positions. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 330-360, and/or other instructions. As an alternative or in addition to retrieving and executing instructions, processor 310 may include at least one electronic circuit comprising a number of electronic components for performing the functionality of at least one of instructions 330-360, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 430-460, and/or other instructions. As an alternative or in addition to retrieving and executing instructions, processor 410 may include at least one electronic circuit comprising a number of electronic components for performing the functionality of at least one of instructions 430-460, and/or other instructions.

FIG. 3 is a flow diagram depicting an example method for determining car positions. The various processing blocks and/or data flows depicted in FIG. 3 (and in the other drawing figures such as FIGS. 4 and 5) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 3 as illustrated (and described in greater detail below) is meant be an example and, as such, should not be viewed as limiting. The method of FIG. 3 may be implemented in the form of executable instructions stored on a machine-readable storage medium, such as storage medium 420, and/or in the form of electronic circuitry.

In an operation 500, position data for a legacy car and information about a make and model of the legacy car may be received by an edge device. For example, the edge device 100 (and/or the legacy car engine 130, the legacy car instructions 330, or other resource of the edge device 100) may receive the position data and the information about the legacy car. The edge device 100 may receive the position data and the information about the legacy car in a manner similar or the same as that described above in relation to the execution of the legacy car engine 130, the legacy car instructions 330, and/or other resource of the edge device 100.

In an operation 510, a set of sensor data about a set of observed cars within a distance of the sensor-rich car, a set of position data for the set of observed cars, and a set of visual data of the set of observed cars may be received by the edge device, where the set of observed cars includes the legacy car and the sensor-rich car. For example, the edge device 100 (and/or the sensor-rich car engine 140, the sensor-rich car instructions 340 or other resource of the edge device 100) may receive the set of sensor data, the set of position data, and the set of visual data. The edge device 100 may receive the set of sensor data, the set of position data, and the set of visual data in a manner similar or the same as that described above in relation to the execution of the sensor-rich car engine 140, the sensor-rich car instructions 340, and/or other resource of the edge device 100.

In an operation 520, an updated position for the legacy car may be determined based on the set of position data for the set of observed cars, the set of visual data, and the set of sensor data. For example, the edge device 100 (and/or the position determination engine 150, the position determination instructions 350 or other resource of the edge device 100) may determine the updated position for the legacy car. The edge device 100 may determine the updated position for the legacy car in a manner similar or the same as that described above in relation to the execution of the position determination engine 150, the position determination instructions 350, and/or other resource of the edge device 100.

In some examples, determining an updated position for the legacy car may be performed in various manners. FIG. 4 is a flow diagram depicting an example method for determining car positions, and particularly for determining an updated position for the legacy car.

In an operation 521, a set of visual fingerprints for the set of observed cars may be received by the edge device. For example, the edge device 100 (and/or the position determination engine 150, the position determination instructions 350 or other resource of the edge device 100) may receive set of visual fingerprints for the set of observed cars. The edge device 100 may receive set of visual fingerprints for the set of observed cars in a manner similar or the same as that described above in relation to the execution of the position determination engine 150, the position determination instructions 350, and/or other resource of the edge device 100.

In an operation 522, the set of visual fingerprints for the set of observed cars may be correlated with information about the legacy car. For example, the edge device 100 (and/or the position determination engine 150, the position determination instructions 350 or other resource of the edge device 100) may correlate the set of visual fingerprints with information about the legacy car ar. The edge device 100 may correlate the set of visual fingerprints fo with information about the legacy car in a manner similar or the same as that described above in relation to the execution of the position determination engine 150, the position determination instructions 350, and/or other resource of the edge device 100.

In an operation 523, the correlated set of visual fingerprints may be added to a connected graph as nodes. For example, the edge device 100 (and/or the position determination engine 150, the position determination instructions 350 or other resource of the edge device 100) may add the correlated set of visual fingerprints as nodes in the connected graph. The edge device 100 may add the correlated set of visual fingerprints as nodes in the connected graph in a manner similar or the same as that described above in relation to the execution of the position determination engine 150, the position determination instructions 350, and/or other resource of the edge device 100.

In an operation 524, the sum of distances between the geometric medians of the nodes may be minimized to determine the precise position of each node. For example, the edge device 100 (and/or the position determination engine 150, the position determination instructions 350 or other resource of the edge device 100) may minimize the sum of distances between the geometric medians. The edge device 100 may minimize the sum of distances between the geometric medians in a manner similar or the same as that described above in relation to the execution of the position determination engine 150, the position determination instructions 350, and/or other resource of the edge device 100.

Returning to FIG. 3, in an operation 530, the updated position for the legacy car may be provided. For example, the edge device 100 (and/or the position providing engine 160, the position providing instructions 360, or other resource of the edge device 100) may provide the updated position for the legacy car. The edge device 100 may provide the updated position for the legacy car in a manner similar or the same as that described above in relation to the execution of the position providing engine 160, the position providing instructions 360, and/or other resource of the edge device 100.

The foregoing disclosure describes a number of example implementations for determining car positions. The disclosed examples may include systems, devices, computer-readable storage media, and methods for determining car positions. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for determining car positions, the method comprising:

receiving, at an edge device, position data from a mobile device associated with a legacy car, the position data comprising global position information for the legacy car;

receiving, at the edge device, sensor data from a sensor-rich car, the sensor data comprising position information, visual information, and distance information about one or more observed cars in the vicinity of the sensor-rich car;

determining, by the edge device, an updated position for the legacy car based on a combination of the position data from the mobile device and the sensor data from the sensor-rich car; and providing, by the edge device, the updated position for the legacy car to one or more of the legacy car and the sensor-rich car.

2. The method of claim 1, wherein determining the updated position for the legacy car comprises:

generating a visual fingerprint for one or more of the observed cars based on the sensor data; and correlating visual fingerprints of the observed legacy cars with car information about the legacy car, wherein car information comprises one or more of car make, model, color, position, and year of manufacture.

3. The method of claim 2, wherein determining the updated position of the legacy car includes:

determining, for one or more of the observed cars, a set of constraints; and determining, for one or more of the observed cars, a respective position of the observed car based on the set of constraints.

4. The method of claim 3, wherein determining the updated position of the legacy car includes:

determining the updated position of the legacy car by minimizing a sum of distances from the geometric median of the determined positions from each of the set of observed cars and the visual fingerprint of the legacy car.

5. The method of claim 3, wherein at least one of the constraints in the set of constraints is based upon information about a road associated with the sensor-rich car.

6. The method of claim 3, wherein at least one of the constraints in the set of constraints is based upon information about a distance and an angle of the sensor-rich car relative to a second sensor-rich car, wherein the second sensor-rich car is one of the observed cars, and wherein the method further comprises:

determining, for the sensor-rich car, a next move of the sensor-rich car based on the set of constraints, the updated position of the legacy car, and the position of one or more of the observed cars; and providing, to the sensor-rich car, an indication of the next move.

7. The method of claim 1, further comprising:

receiving, responsive to providing the updated position of the legacy car, car dynamics information of the legacy car;

determining a new updated position based on the received information about the car dynamics of the legacy car; and providing the new updated position.

8. A non-transitory machine-readable storage medium comprising instructions executable by a physical processor of a computing device for determining car positions, the machine-readable storage medium comprising:

instructions to receive position data from a mobile device associated with a legacy car, the position data comprising global position information for a legacy car;

instructions to receive sensor data from a sensor-rich car, the sensor data comprising position information, visual information, and distance information about one or more observed cars in the vicinity of the sensor-rich car;

instructions to correlate car information about legacy car with the sensor data;

instructions to determine an updated position for the legacy car based on the correlation; and instructions to provide the updated position for the legacy car.

9. The non-transitory machine-readable storage medium of claim 8, wherein the instructions to correlate car information about the legacy car comprise:

instructions to generate a visual fingerprint for one or more of the observed cars based on the sensor data; and instructions to correlate a visual fingerprint of the legacy car with the visual fingerprints of the other observed cars.

10. The non-transitory machine-readable storage medium of claim 9, wherein the instructions to determine the updated position for the legacy car comprise:

instructions to determine, for each of the observed cars, a set of constraints; and instructions to determine, for each of the observed cars, a respective position of the observed car based on the set of constraints.

11. The non-transitory machine-readable storage medium of claim 10, wherein the instructions to determine the updated position for the legacy car comprise:

instructions to determine the updated position of the legacy car by minimizing a sum of distances from the geometric median of the determined positions from each of the set of observed cars and the visual fingerprint of the legacy car.

12. The non-transitory machine-readable storage medium of claim 10, wherein the set of constraints include information about a road associated with the sensor-rich car.

13. The non-transitory machine-readable storage medium of claim 10, wherein at least one of the constraints in the set of constraints is based upon information about a distance and an angle of the sensor-rich car relative to a second sensor-rich car, wherein the second sensor-rich car is one of the observed cars, and wherein the instructions further comprise: instructions to determine, for the sensor-rich car, a next move of the sensor-rich car based on the set of constraints, the updated position of the legacy car, and the position of one or more of the observed cars; and instructions to provide, to the sensor-rich car, an indication of the next move.

14. The non-transitory machine-readable storage medium of claim 8, further comprising:

instructions to, responsive to providing the updated position of the legacy car, receive car dynamics information of the legacy car;

instructions to determine a new updated position based on the received information about the car dynamics of the legacy car; and instructions to provide the new updated position.

15. A system for determining car positions, the system comprising:
  a physical processor that implements machine readable instructions that cause the system to:
    receive information from a mobile device associated with a legacy car, the information comprising position data of the legacy car and information about a make and model of the legacy car;
    receive, from a sensor-rich car, a set of sensor data about a set of observed cars in the vicinity of the sensor-rich car, the set of sensor data comprising a set of position data for the set of observed cars, and a set of visual data of the set of observed cars, wherein the set of observed cars includes the legacy car and the sensor-rich car;
    correlate information about the legacy car with the set of sensor data, the set of position data, and the set of visual data;
    determine an updated position for the legacy car based on the correlation; and
    provide, to the mobile device, the updated position for the legacy car.

16. The system of claim 15, wherein the physical processor implements machine readable instructions to cause the system to:
  determine a visual fingerprint of one or more observed cars of the set of observed cars based on the set of sensor data;
  determine, for each of the set of sensor-rich cars and the legacy car, a set of constraints; and
  instructions to determine, for each of the set of observed cars, a respective position of the observed car based on the set of constraints and a corresponding visual fingerprint.

17. The system of claim 16, wherein the physical processor implements machine readable instructions to cause the system to determine the updated position for the legacy car by:
  determining the updated position of the legacy car by minimizing a sum of distances from the geometric median of the determined positions from each of the set of observed cars and the visual fingerprint of the legacy car.

18. The system of claim 16, wherein at least one of the constraints in the set of constraints is based upon information about a road associated with the sensor-rich car, and
  wherein the physical processor implements machine readable instructions to cause the system to:
    provide, to the sensor-rich car, the updated position of the legacy car, and information about a position of one or more observed cars of the set of observed cars.

19. The system of claim 16, wherein at least one of the constraints in the set of constraints is based upon information about a distance and an angle of the sensor-rich cars relative to a second sensor-rich car of the set of observed cars, and
  wherein the physical processor implements machine readable instructions to cause the system to:
    determine, for the sensor-rich car, a next move of the sensor-rich car based on the set of constraints, the updated position of the legacy car, and the positions of the set of observed cars updated position of the legacy cars, and the position of one or more of the set of sensor-rich cars; and
    provide, to the sensor-rich car, an indication of the next move.

20. The system of claim 15, wherein the physical processor implements machine readable instructions to cause the system to:
  responsive to providing the updated position of the legacy car, receive, from the mobile device, car dynamics information of the legacy car;
  determine a new updated position based on the received information about the car dynamics of the legacy car; and
  provide the new updated position to the mobile device.

* * * * *